(12) United States Patent
Hughes

(10) Patent No.: US 6,938,790 B2
(45) Date of Patent: Sep. 6, 2005

(54) DRIP CONTAINMENT AND CONVEYANCE SYSTEM

(76) Inventor: Dale Hughes, Box 25021, Saskatoon (CA), S7K 8B7

( * ) Notice: Subject to any disclaimer, the term of this patent is extended or adjusted under 35 U.S.C. 154(b) by 181 days.

(21) Appl. No.: 10/162,785

(22) Filed: Jun. 6, 2002

(65) Prior Publication Data

US 2003/0226847 A1 Dec. 11, 2003

(51) Int. Cl.[7] .............................................. B65D 21/02
(52) U.S. Cl. .................. 220/23.4; 137/312; 220/23.86; 220/571
(58) Field of Search ............................. 220/23.4, 23.86, 220/571, 556, 573, 4.17, 23.2, 23.6; 137/312; 52/177; 206/558, 504; 180/69.1; 296/38; 141/86, 87, 88; 184/106

(56) References Cited

U.S. PATENT DOCUMENTS

| | | | | |
|---|---|---|---|---|
| 1,634,248 A | * | 6/1927 | Marulli ...................... 220/23.2 |
| 1,938,909 A | * | 12/1933 | Huff ........................... 220/574 |
| 2,613,978 A | * | 10/1952 | Marulli ...................... 294/27.1 |
| 2,907,287 A | * | 10/1959 | Trostle ......................... 52/463 |
| 3,285,409 A | * | 11/1966 | Loran ........................ 206/63.5 |
| 3,811,595 A | * | 5/1974 | Eckdahl et al. ............. 220/23.4 |
| 3,997,101 A | * | 12/1976 | Florian ........................ 229/407 |
| 4,069,941 A | * | 1/1978 | Popplewell et al. ........ 220/23.4 |
| 4,484,661 A | * | 11/1984 | Evenson ..................... 184/106 |
| 4,609,580 A | * | 9/1986 | Rockett et al. .............. 428/198 |
| 4,972,951 A | * | 11/1990 | Vartanian .................. 206/387.1 |
| 5,018,235 A | * | 5/1991 | Stamatiou et al. ............ 15/215 |
| 5,142,733 A | * | 9/1992 | Mogel et al. ..................... 16/8 |
| 5,274,953 A | * | 1/1994 | Nicholson ....................... 47/87 |
| 6,102,086 A | * | 8/2000 | Holtby ......................... 141/86 |
| 6,711,851 B2 | * | 3/2004 | Mischo ........................ 47/65.9 |

FOREIGN PATENT DOCUMENTS

JP            7-33146     *    7/1995

* cited by examiner

*Primary Examiner*—Joseph C. Merek

(57) ABSTRACT

A tray has a containment space defined by a tray floor and a continuous peripheral ridge extending upwardly from the tray floor. The ridge has an inner sidewall extending inward and downward from an upper edge of the ridge and an outer sidewall extending downward from the upper edge of the ridge. Multiple trays are coupled together by a connector member having lobes that mate with the shell-like structure of the ridge, and provide additional strength to the peripheral ridge. The tray can be provided with a shell-like construction such that multiple trays can be stacked compactly one on top of the other.

16 Claims, 10 Drawing Sheets

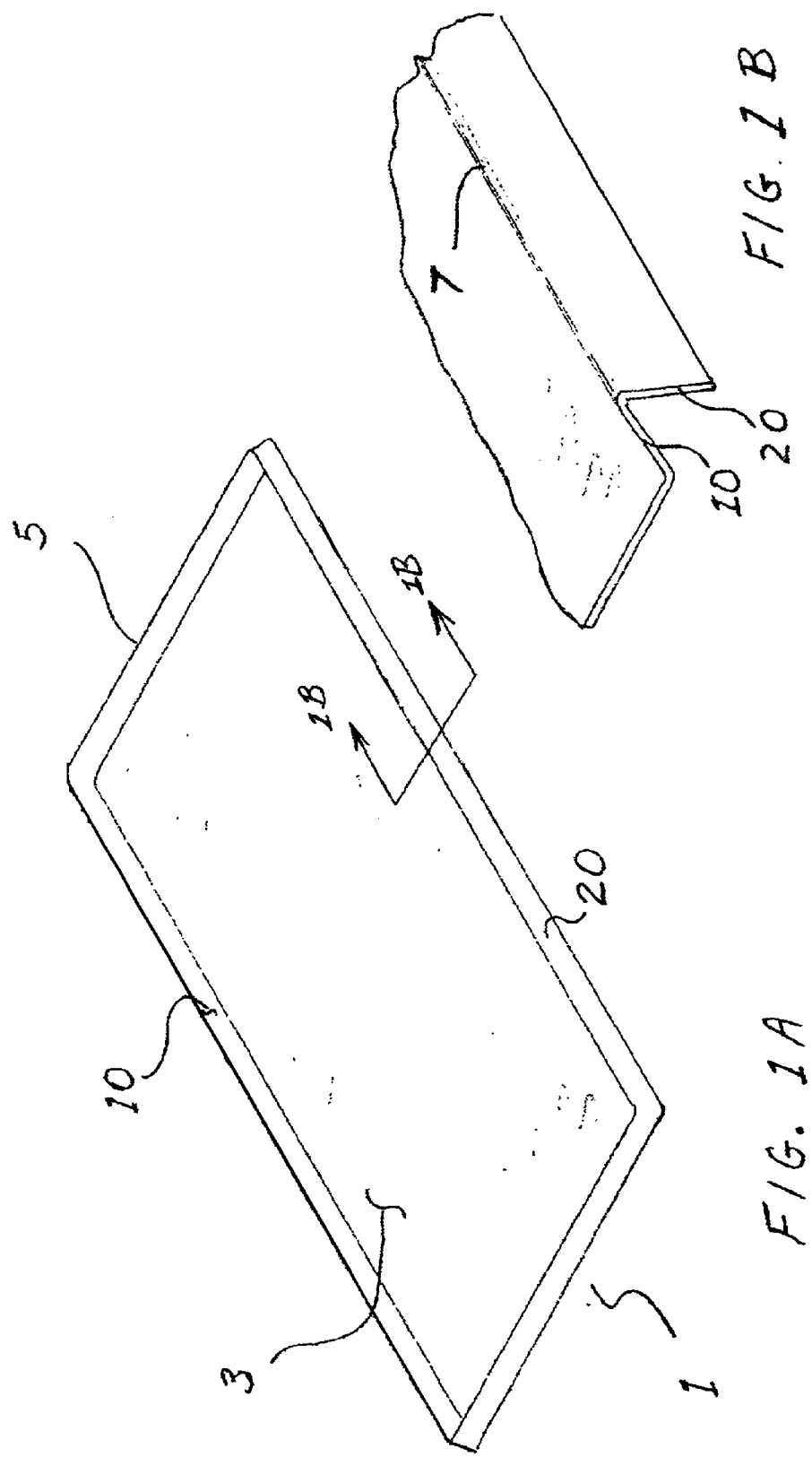

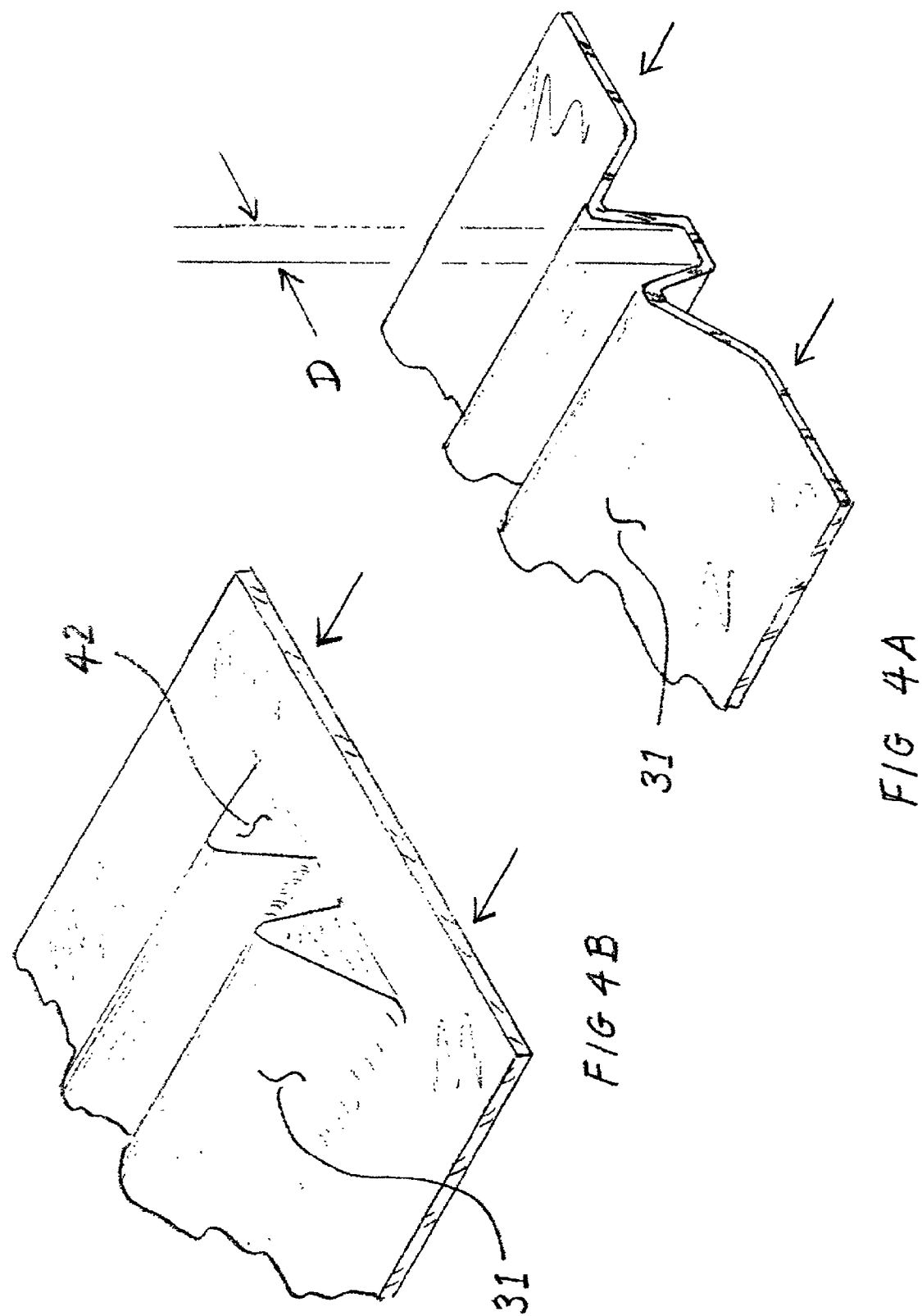

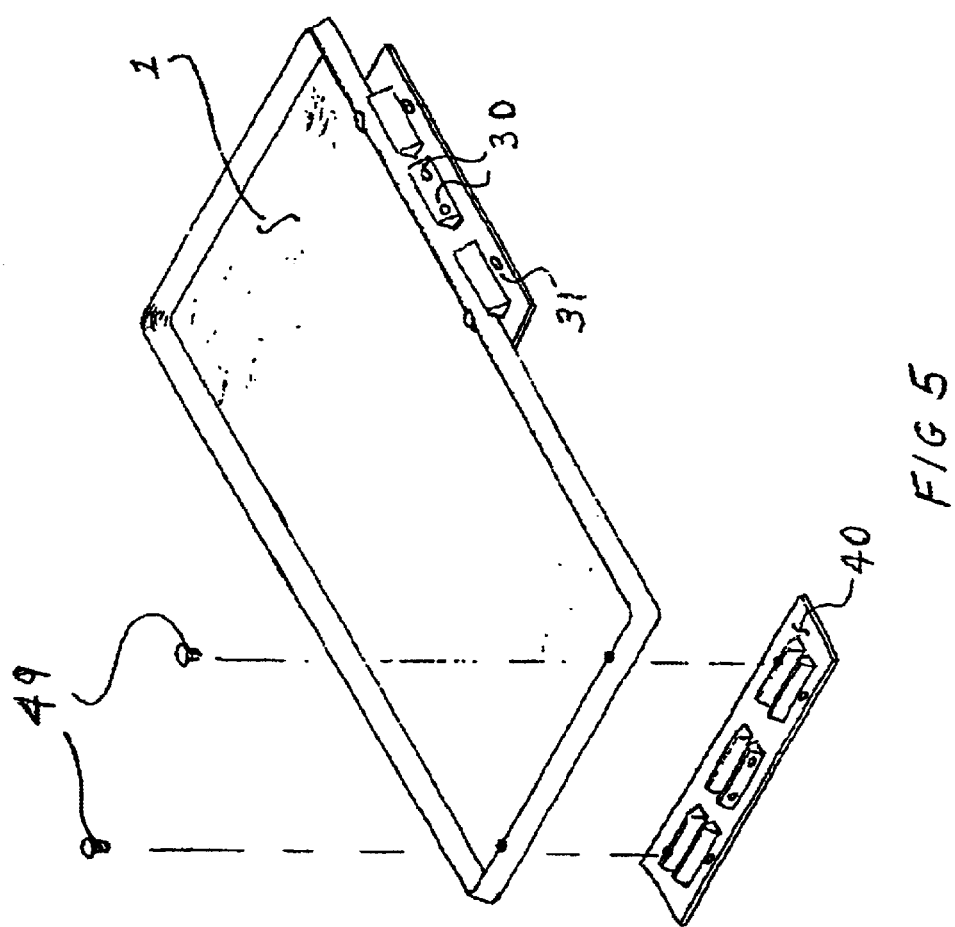

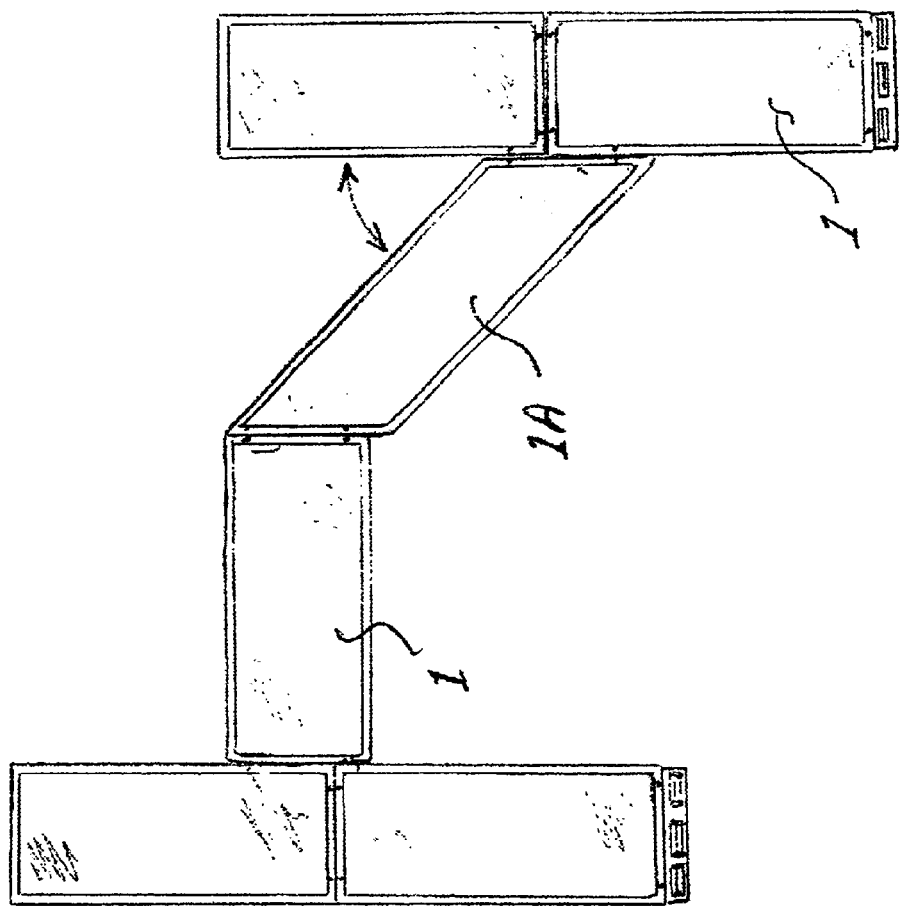

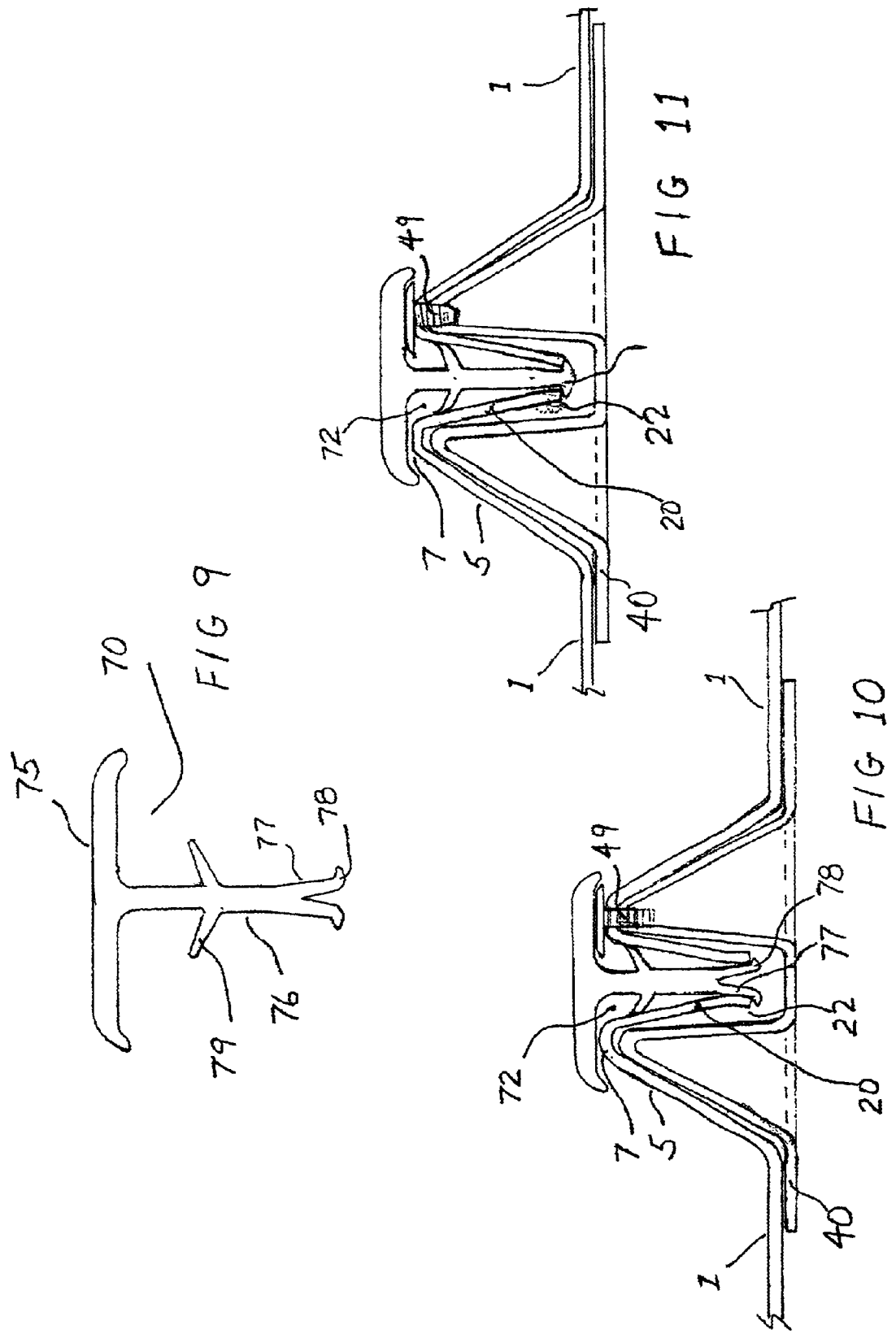

DRIP CONTAINMENT AND CONVEYANCE SYSTEM

FIELD OF INVENTION

The invention relates to a system of trays for containing and disposing of drips or spills.

BACKGROUND OF INVENTION

Drips and spills can originate from many industrial and domestic sources. The need to prevent or control these spills is dependent upon the type of fluid or material being lost, and the location where this loss occurs.

For example, environmentally hazardous materials such as fuels, lubricants, process chemicals or paint must be collected regardless of location. Less hazardous materials such as road salt, or mud and grime may only need to be collected if they are damaging to the floors or structure of a building.

In each particular case, the type of material may be the greatest factor, or the location may be the greatest factor in determining the best method of containment and disposal. The relative seriousness of each would also dictate whether immediate preventive actions are necessary or possible.

In many domestic or light industrial applications there are situations where a specifically conFig.d containment and handling system is needed. The ability to assemble a system from a selection of basic modules of various shapes and sizes will address this need.

The nature of the drip source or the common spill pattern will dictate what the arrangement of the drip trays should be. This may require that the trays be in a rectangular arrangement to protect a large area. This may also dictate an arrangement in end-to-end relation to allow containment of drips from a travelling source. Some situations require that the containment take place in several specific areas by individual containment structures.

These modular systems must possess the structural integrity necessary to withstand loads when in high traffic areas where constant foot traffic or wheeled traffic such as carts or vehicles will be encountered.

These modular shapes must also be easily removable for disposal purposes, or for temporary storage. The ability of the structure to conform to uneven surfaces would be of further benefit as many floor surfaces are not flat.

Drip trays of the prior art are arranged in rectangular grids and are secured together in this grid-like pattern by jaw-like members. These drip trays also have overlapping flanges, which provide the ability to capture all of the material that may fall within the affected areas.

This system would be effective, but appears to have some drawbacks. The structure of the grid pattern does not appear to allow continuous end-to-end arrangement, and the method of securing the trays together requires removal of the jaw-like member to accomplish removal. The edge structure also prevents the traverse of wheeled traffic in any direction.

A drip tray with a different structure would be more effective when used as an individual item, would allow for many more arrangement options that could fit in more varied applications. The ability to remove and store these trays could be facilitated as well.

The commercial features of the tray must also be considered in some detail. The ability to compactly arrange individual trays when in transit for retail purpose and for storage must be considered.

SUMMARY OF THE INVENTION

It is an objective of the invention to provide a tray adapted for use in a system of trays in which each tray is easily manageable while retaining the material that it contains for relocation or disposal, while being durable and resilient to the passage of traffic.

It is also an objective to provide for easy positioning and moving of a tray or group of trays.

The present invention consists of modular trays of differing sizes that can be used individually, or in multiples, to provide containment for spills and drips. Multiple numbers of these trays may be loosely arranged or coupled, to address specific needs.

The tray is molded of a polymer-type material which provides for a chemical and corrosion-resistant structure. It also provides semi-rigid mechanical characteristics that are important to the handling and positioning of the tray and its reaction to loads.

When in a coupled arrangement, it is possible that unintended accidental forces may be applied to a one of the trays of the arrangement. If sufficient forces are applied, the unique shape of the structural lobes and ridge sidewalls, in conjunction with the polymer material's mechanical properties, will allow the disengagement of the tray experiencing the force from adjacent trays without any resultant material failures.

The trays may be used individually to catch drips from smaller sources such as a leaky mechanical drive train component, a leaky plumbing fixture or an industrial process such as a conveyor belt intersection. The trays can be arranged in adjacent arrays to catch paint drips, chemical strippers or wash fluids under conveyor systems.

A primary use of the trays would be in domestic vehicle garages where they will be used to catch melt water, rain water, salt, mud and general road grime that is transported there by way of vehicle exteriors.

The trays in an array can be loosely coupled with connector members. The peripheral ridge of the tray will fit loosely over top of lobes on the connector member extending upward. The connector member can be fastened mechanically to one of the adjacent trays with screws or the like.

The connector member can be an integral molded component comprising lobes extending upward from a plate, thereby increasing the structural integrity of the peripheral ridge of the tray at chosen locations to support vehicle wheels passing over the peripheral ridge. The sloped outer sidewalls, and relatively low profile of the peripheral ridge allows vehicles to pass over without forcing the tray from its position.

A tray may be easily removed by means of a handle that can be used to grip the individual modules through aperture in the outer sidewall structure or similar perforations in the lobes of an attached connector member. The weight of each tray is such that an individual with average abilities may drag the combined weight of the tray and contents to a suitable location for surface disposal.

When environmentally hazardous materials must be disposed of there will be more appropriate disposal methods required. An aid to this is provided in the form of an absorbent pad that can be held in the tray by a spring wire retainer clip. Reusable materials may be utilized for this absorbent pad where liquids can be pressed into approved containers and disposed of separately.

Entry and exit of wheeled traffic may create waveforms in contained liquid, which can be prevented from overflowing the edges of the tray with the addition of a specifically designed baffle system. Methods of incorporating this feature may vary. A separate component consisting of a molded polymer structure, or fabricated rubber strips may be added as an option.

In one aspect, the invention provides a tray having a containment space defined by a tray floor and a continuous peripheral ridge extending upwardly from the tray floor. The ridge has an inner sidewall extending inward and downward from an upper edge of the ridge and an outer sidewall extending downward from the upper edge of the ridge.

The tray can be provided with a shell-like construction such that multiple trays can be stacked compactly one on top of the other.

In another aspect of the invention, multiple trays are coupled together by a connector member having lobes that mate with the shell-like structure of the ridge, and provide additional strength to the peripheral ridge.

DESCRIPTION OF DRAWINGS

FIG. 1A is a perspective view of a tray of the invention;

FIG. 1B is a perspective section view of the peripheral ridge of the tray;

FIG. 4A is a section view of the connecting member of FIG. 3 through the lobes;

FIG. 4B is a section view of the connecting member of FIG. 3 adjacent to the lobes;

FIG. 5 illustrates assembly of a typical tray array;

FIG. 6C is a plan view of an angular coupled array of trays;

FIG. 9 is an end view of a filler cap;

FIG. 10 is a schematic section view showing the filler cap in position between two adjacent trays in an array of trays;

FIG. 11 illustrates an alternate filler cap member.

DETAILED DESCRIPTION OF PREFERRED EMBODIMENTS

Figure 2A:
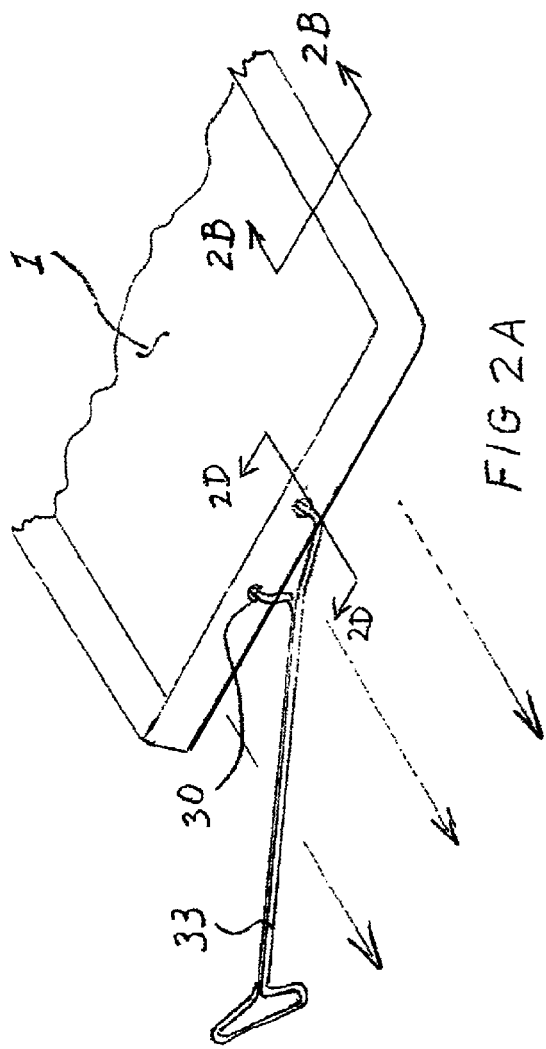
FIG. 2A is a perspective of the tray with a drag handle attached.
Figure 2B:
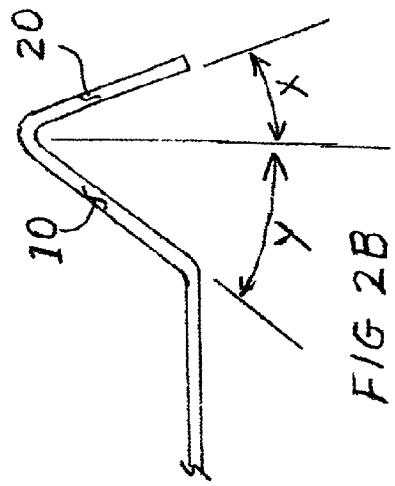
FIG. 2B is an end section view of the peripheral ridge of the tray illustrating the angular arrangement of the inner and outer sidewalls that form the peripheral ridge.
Figure 2C:
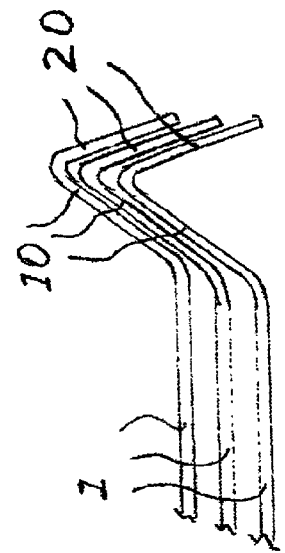
FIG. 2C is a schematic section view illustrating the stacking facilitated by the outward slope of the outer sidewall.

FIGS. 1A and 1B show a tray 1 of the invention consisting of a tray floor 3 with an integral molded peripheral ridge 5 around the periphery. The sidewall structure incorporates an angled inner sidewall 10 and outer sidewall 20 intersecting at an upper edge 7 at the top. The cross-section of the ridge 5 can be described as an inverted V-shape. The nominally low ridge height and angled sidewalls 10, 20 allow wheel passages without the containment tray 1 being dislodged from its position. The intersecting angles 'X' and 'Y' that each sidewall 10, 20 forms with the vertical are not equal in this example. The angle 'X' formed with the outer sidewall plane is the minimum required to allow a plurality of trays 1 to be stacked prior to assembly, as shown in FIG. 2C. The corresponding internal angle 'Y' is sufficient to provide enough open section to allow the engagement of a connector member 40 as in FIG. 5.

Figure 2D:
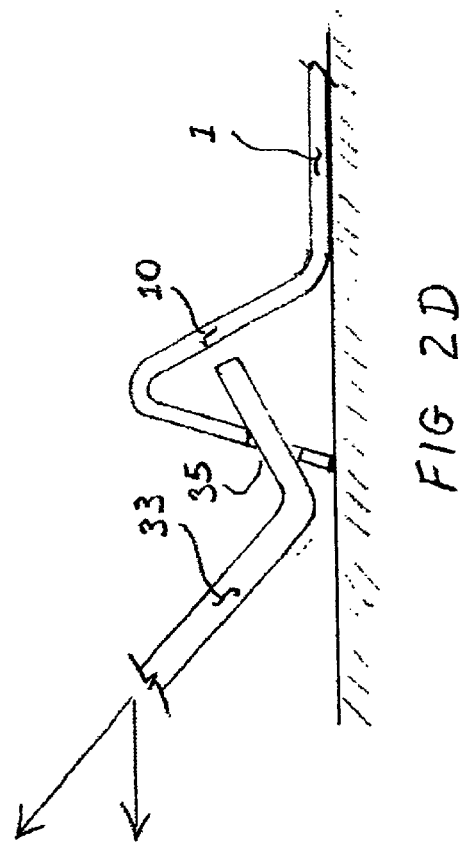
FIG. 2D is a side section view of the peripheral ridge of the tray illustrating the mechanical geometry of the drag handle attachment.

The outer sidewall 20 is modified to allow the temporary attachment of handles for dragging, lifting or storage. Apertures 30 are made in the outer sidewall 20 for this purpose. FIG. 2A shows the insertion of a handle 33 with bent fork-like prongs 35. As the handle 33 is rotated downward slightly the prongs will be locked into the perforated sidewall as in FIG. 2D. The fulcrum point formed by the bend is forced against the floor or ground to provide a locking action.

Figure 3:
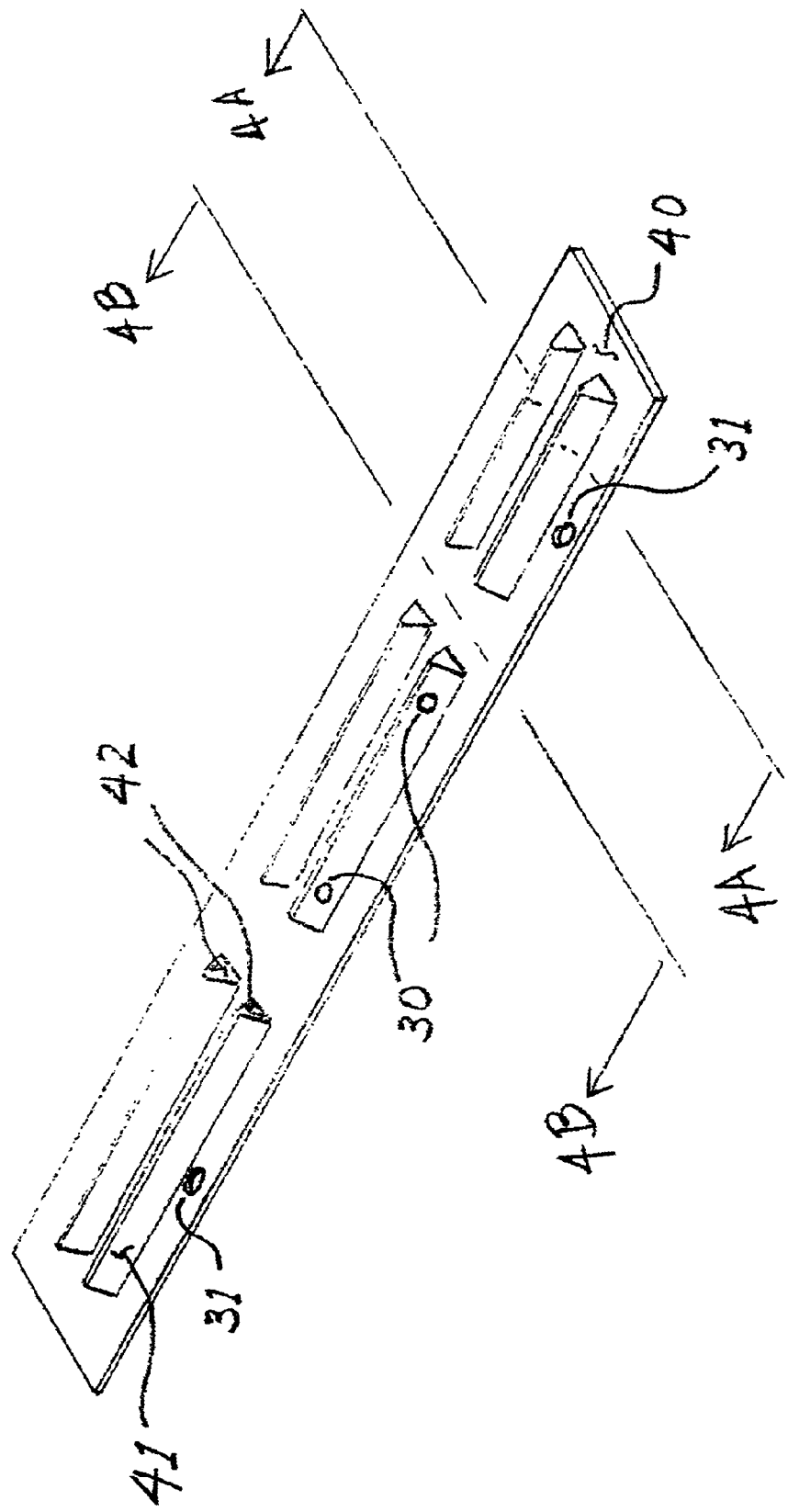
FIG. 3 is a perspective view of a connector member.

A connector member 40 is shown in FIG. 3. Shape is consisting of a plate 45 with integrally molded triangular lobes 41 extending upward from the plate 45. These lobes 41 are arranged linearly with spaces between. The lobes 41 have closed endwalls 42 to provide structural integrity and strength sufficient to support vehicle wheels passing over the ridge 5. The lobes 41 conform generally to the tray sidewalls 10, 20, as can be seen in FIG. 10.

Apertures 30 for drag handle connection, and apertures for hanging storage 31 are incorporated in the molded connector members. The fulcrum point, described above for the apertures 30 in the outer sidewall of the ridge 5 may be applied to the plate 45 of the connector member 40 to provide a locking action similar to that when the fulcrum point is the floor as in FIG. 2D.

FIG. 4A is a section view of the connector member 40. The nominal separation distance 'D' between the two linear rows of lobes is such that the outer sidewalls 20 of a tray 1 fit loosely into the space provided. In this manner, the lobes 41 may provide support for the ridges 5 on two or more adjacent trays 1. An inherent coupling action is also provided in conjunction with this arrangement. Any application of sufficient tensile loads, rotational forces or lifting forces, either individually or in combination will separate an unattached tray 1 from this arrangement. For example, the application of rotational forces, which result from movement of vehicle steering axles, will dislodge the affected tray from other trays in this arrangement without damage to the individual tray's structure. The trays 1 and outer sidewalls 20 are resilient and will flex to allow disengagement.

FIG. 5 illustrates the attachment of a connector member 40 to a ridge 5 of a tray 1 with screws 49 or like method. Alternative fasteners such as ribbed plastic pins will allow for much easier detachment when necessary. Similar attachments may be made to the opposite or adjacent ridges of this module. Note apertures 30, 31 in connector members are oriented to the outside of the tray 1.

Figure 6B:
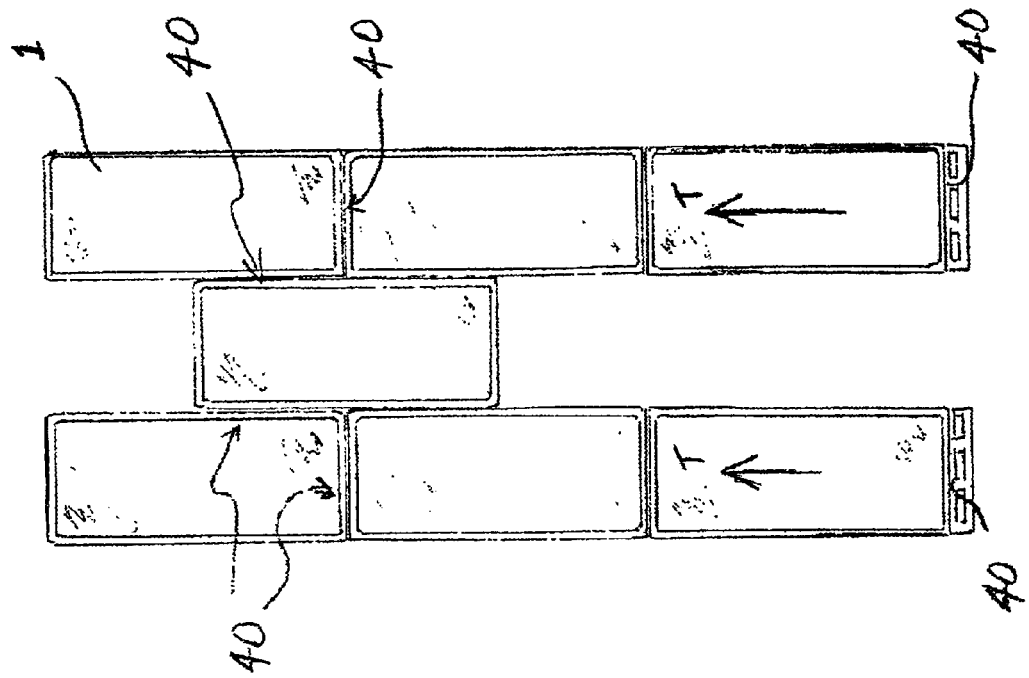
FIG. 6B is a plan view of a coupled array of trays.
Figure 6A:
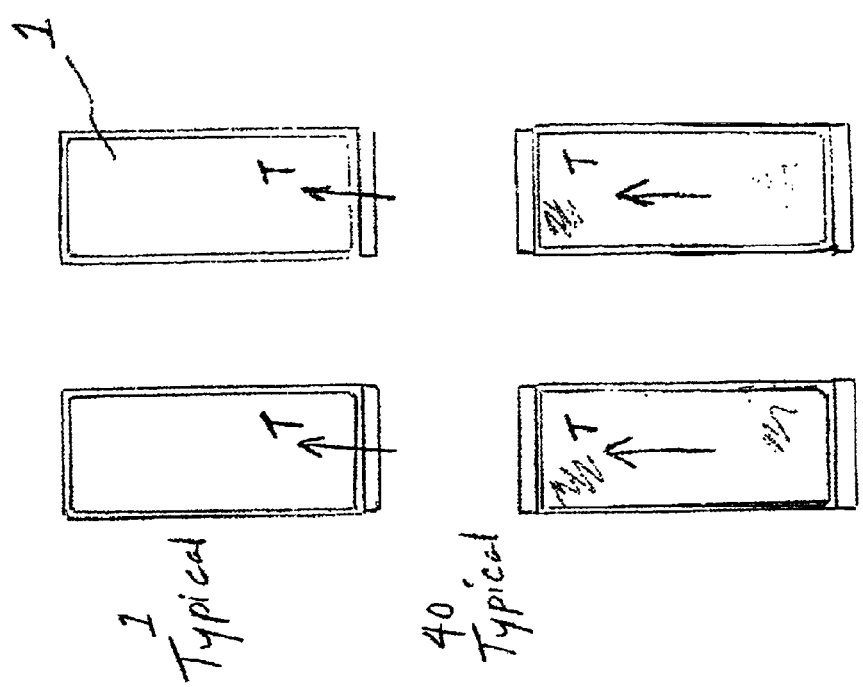
FIG. 6A is a plan view of a loose array of trays.

FIGS. 6A and 6B illustrate typical vehicle storage applications. FIG. 6A shows a loose arrangement of trays with connector members 40 attached as necessary to support vehicle traffic in direction T. FIG. 6B shows a coupled array of trays 1 for a larger vehicle, which may possess more capability for carrying moisture or contaminants.

Note that trays 1 that are in coupled arrays as shown will utilize one connector member 40 for support and inherent coupling purposes. FIG. 6C shows coupled arrangement of a non-rectangular tray 1A to adjacent rectangular trays 1. In this example the intersecting angle is 45 degrees. Alternative shapes may be produced with a variety of angles determined by configuration requirements.

Figure 7:
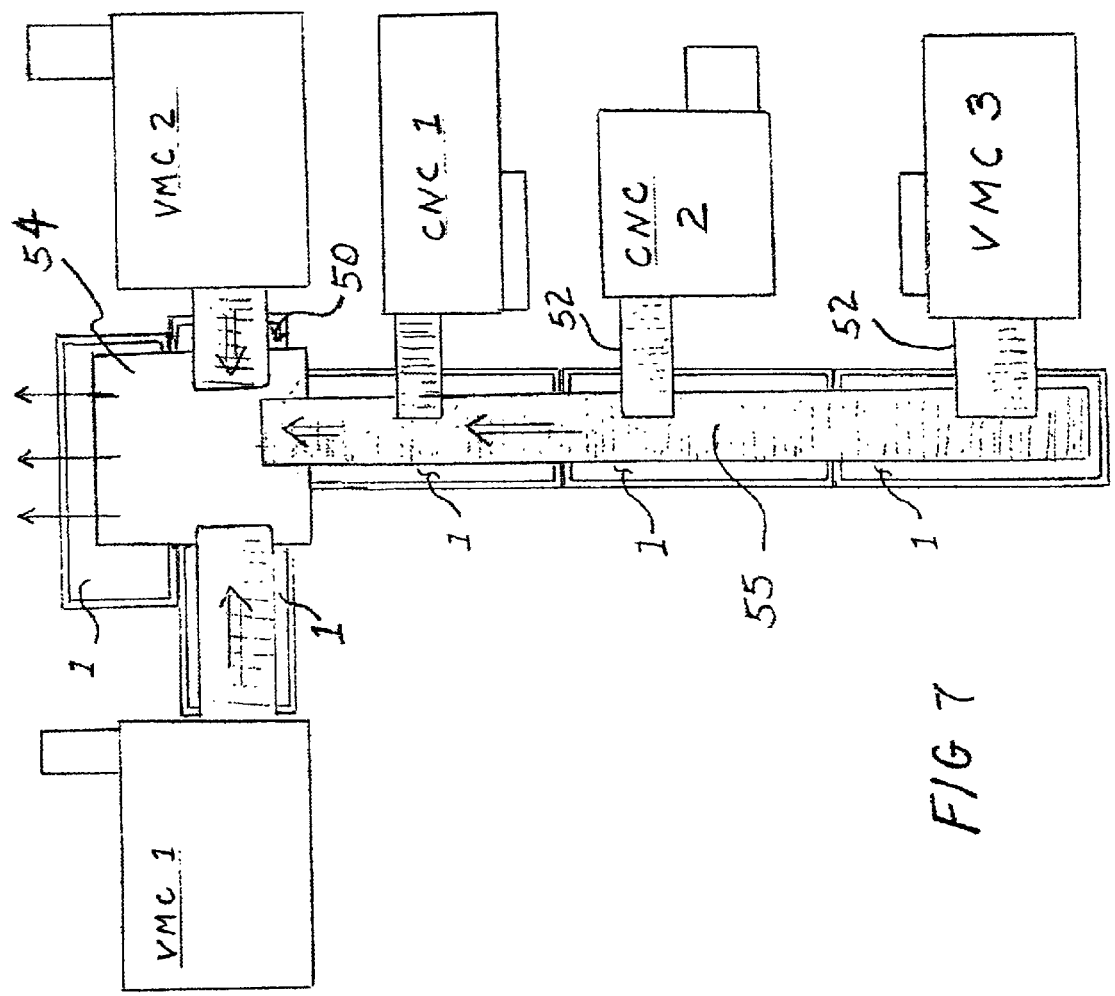
FIG. 7 is a plan view of an array of trays for a typical industrial application.

FIG. 7 is a plan view of typical configuration for industrial purposes. Machine center chips and scarf, and accompanying cutting fluid, are elevated by chip conveyors 52 onto a low conveyor 55 for transport to a central collection location such as container 54 for removal. Any of these materials that adhere to the conveyor belt may fall to the floor surface on the return pass (lower surface).

Most drilling fluids are considered hazardous, and the chips and scarf are often difficult to sweep. It would be much more advantageous to collect them in the tray array shown. Note the short 'square' tray 50 used in the confined space between VMC 1 and VMC 2.

Figure 8:
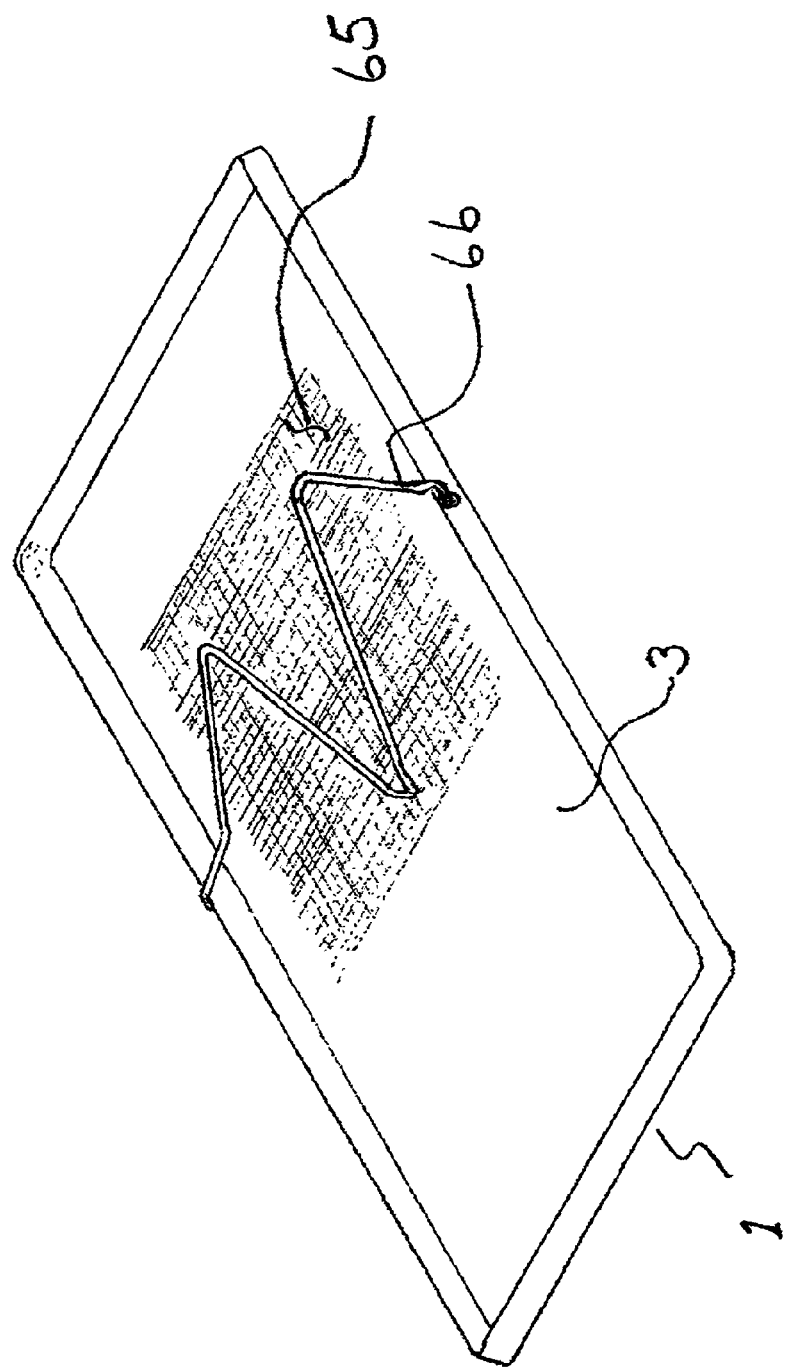
FIG. 8 is a perspective view showing the operation of a spring wire retainer for holding an absorbent pad in position.

FIG. 8 is a perspective of a module 1 with an absorbent pad 65 covering a substantial portion of the tray floor 3, and maintained in position by a formed spring wire clip 66.

FIGS. 9 and 10 illustrate a filler cap 70 adapted to engage adjacent trays 1 and to cover the gap 72 between the upper edges 7 of the peripheral ridges 5 of the adjacent trays 1. The filler cap 70 comprises a cap member 75 extending laterally beyond the upper edge 7 of the peripheral ridge 5 of each adjacent tray 1, as illustrated in FIG. 10. A lock member 76 extends downward from the center of the cap member 75. A pair of resilient legs 77 extend downward from the bottom end of the lock member 76. The legs 77 are separated by an empty space such that same may flex toward each other. Each leg 77 comprises an outward extending tab 78 adapted to engage the bottom edge 22 of outer sidewalls 20 of an adjacent tray 1. A resilient centering member 79 extends outward on each side of a midpoint of the lock member 76 and bears against the outer sidewall 20 of each adjacent tray 1.

Alternatively, as illustrated in FIG. 11, the legs can be omitted and the bottom end of the lock member 76 could comprise an outwardly extending tabs 78 on each side that push against the bottom edge 22 of the outer sidewalls 20 and cause them to flex such that the tabs move down and under the outer edge 22, thereby engaging same and securing the filler cap 70 in place.

The trays and connector members are arranged as desired, and as illustrated, the connector member 40 is attached to one of the trays with a screw 49 or the like. The lock member 76 of the filler cap 70 is then pushed down into the gap 72 between trays. The resilient legs 77 are squeezed together until the tabs 78 reach the bottom edges 22 of the outside sidewalls 20, whereupon the legs 77 spring out so that the tabs 78 are under the bottom edges 22 of the outer sidewalls 20. The centering members 79 hold the lock member 76 substantially centered in the gap 72 to properly position the cap member 75 so that it extends over the upper edges 7 of the ridge 5 on each tray 1.

The filler cap 70 substantially prevents drips from falling into the gap 72, and instead directs such drips into the adjacent trays 1. The filler cap 70 is removed by an upward force applied thereto. The illustrated filler cap also serves to lock trays together such movement of one tray relative to another is inhibited.

The described invention provides a means of collecting materials that are leaking or spilling from various sources. The modular design allows for extensive configurations in a variety of applications, particularly in areas where wheeled traffic is encountered or industrial processes exist.

Persons skilled in the art will be able to make modifications to the illustrated embodiments without departing from the spirit and scope of the invention. As an example, the adjacent edges of each modular tray may not necessarily be in a right angle relationship to each other. There may be a desire to create module versions with edges that vary by 30 degrees, 45 degrees or other values, from the usual 90 degree relationship that forms a typical 'corner'.

I claim:

1. An array of trays comprising a plurality of trays coupled in edge to edge relation and adapted to rest on a substantially flat surface, and wherein each tray has a containment space defined by a tray floor and a continuous peripheral ridge extending upwardly from the tray floor, the ridge having an inner sidewall extending inward and downward from an upper edge of the ridge and an outer sidewall extending downward from the upper edge of the ridge such that a void space is created between the inner and outer sidewalls, and wherein the trays are coupled by a connector member comprising a base plate adapted to rest on the flat surface, and at least two lobes extending upward from the base plate, one lobe extending into the void space on one tray, and one lobe extending into the void space on the adjacent tray such that outer surfaces of the lobes are adjacent to the inner and outer sidewalls and thereby support the peripheral ridge wherein the void space of each tray is configured to receive the peripheral ridge of a like tray so that multiple like tray so that multiple like trays can be stacked compactly on top of each other.

2. An array of trays as in claim 1 in which the outer sidewall of each tray extends downward and outward from the upper edge of the ridge to enhance stacking compactly.

3. An array of trays as in claim 1 comprising a grip by which the array can be pulled.

4. An array of trays as in claim 3 in which the grip comprises apertures in the outer sidewall of at least one tray adapted to receive prongs of a puffing handle.

5. An array of trays as in claim 1 further comprising an absorbent pad adapted to cover a substantial portion of the tray floor, and means to retain the absorbent pad in position on the tray floor.

6. An array of trays as in claim 5 wherein the means to retain the absorbent pad in position on the tray floor comprises a spring member, and wherein the spring member engages spring apertures in opposite outer sidewalls of the tray.

7. An array of trays as in claim 1 wherein the outer sidewall extends outwards such that the lobe can disengage from the void space when a tray is subjected to a sufficient lateral force.

8. An array of trays as in claim 1 wherein at least one lobe is attached to a tray defining the void occupied by the at least one lobe.

9. An array of trays as in claim 1 in which the connector member provides for a coupling of trays in which one tray may extend beyond the end of another tray.

10. An array of trays as in claim 1 wherein at least one lobe defines lobe apertures in an outer sidewall thereof, and wherein the lobe apertures are adapted to receive prongs of a pulling handle.

11. An array of trays as in claim 1 further comprising a filler cap adapted to engage adjacent trays and to cover a gap between the upper edge of the peripheral ridge of one tray and the upper edge of the peripheral ridge of an adjacent tray.

12. An array of trays as in claim 1 further comprising a filler cap adapted to engage adjacent trays and to cover a gap between the upper edge of the peripheral ridge of one tray and the upper edge of the peripheral ridge of an adjacent tray.

13. An array of trays as in claim 12 wherein the filler cap comprises: a) a cap member extending laterally beyond the upper edge of the peripheral ridge of each adjacent tray; b) a lock member extending downward from substantially a center of the cap member and adapted to engage a bottom edge of outer sidewalls of each adjacent tray.

14. An array of trays as in claim 13 wherein the lock member comprises a pair of resilient legs extending downward from a bottom end thereof the legs separated by an empty space, the legs each comprising an outward extending tab adapted to engage the bottom edge of outer sidewalls of an adjacent tray.

15. An array of trays as in claim 13 wherein the lock member comprises a pair of outward extending tabs at a bottom end thereof, the outward extending tabs adapted to engage the bottom edge of outer sidewalls of an adjacent tray.

16. An array of trays as in claim 13 wherein the lock member further comprises a resilient centering member extending outward on each side of a midpoint of the lock member and bearing against the outer sidewall of each adjacent tray.

* * * * *